US009544948B2

(12) United States Patent
Pastore et al.

(10) Patent No.: US 9,544,948 B2
(45) Date of Patent: Jan. 10, 2017

(54) POWER SUPPLY DEVICE FOR A HOUSEHOLD APPLIANCE AND AN OPERATING METHOD THEREOF

(71) Applicant: Whirlpool Corporation, Benton Harbor, MI (US)

(72) Inventors: Cristiano Vito Pastore, Comerio (IT); Vittorio Claudio Crisafulli, Comerio (IT); Diego Neftali Gutierrez, Comerio (IT); Alberto Maranzana, Comerio (IT)

(73) Assignee: Whirlpool Corporation, Benton Harbor, MI (US)

( * ) Notice: Subject to any disclaimer, the term of this patent is extended or adjusted under 35 U.S.C. 154(b) by 600 days.

(21) Appl. No.: 14/036,484

(22) Filed: Sep. 25, 2013

(65) Prior Publication Data

US 2014/0166641 A1 Jun. 19, 2014

(30) Foreign Application Priority Data

Sep. 25, 2012 (EP) .................................... 12185880

(51) Int. Cl.
*H05B 6/06* (2006.01)
*H05B 6/04* (2006.01)
*H05B 6/08* (2006.01)

(52) U.S. Cl.
CPC ............. *H05B 6/065* (2013.01); *H05B 6/08* (2013.01)

(58) Field of Classification Search
CPC ................................. H05B 6/065; H05B 6/08
USPC ............... 219/662–665, 666, 660, 661, 656, 671,219/601; 363/44, 17, 21.02, 132, 21.03, 98, 363/140, 97
See application file for complete search history.

(56) References Cited

U.S. PATENT DOCUMENTS

| 3,925,633 | A | 12/1975 | Partridge |
| 2011/0240632 | A1 | 10/2011 | Anton et al. |
| 2012/0321762 | A1* | 12/2012 | Aranda Vazquez ... H05B 6/062 426/231 |

OTHER PUBLICATIONS

European Patent Application No. 12185880.7, filed Sep. 25, 2011, European Search Report with Examiner's comments regarding same, having a mail date of Apr. 22, 2013. Applicant: Whirlpool Europe S.r.l.
"A New ZVS Two-Output Series-Resonant Inverter for Induction Cookers Obtained by a Synthesis Method", Monterde, Hernandez, Burdio, Garcia and Martinez authors. Power Electronics Specialists Conference, Jun. 18, 2000.

* cited by examiner

*Primary Examiner* — Quang Van

(57) ABSTRACT

A power supply device of a household appliance has a switching converter having a rectifying stage electrically connected with the mains, a bus capacitor electrically connected in parallel with at least one output terminal of the rectifying stage, a first and second resonant tank electrically connected with at least a terminal of the bus capacitor, a first and second switching device respectively having a first and second switching period and are connected respectively with the first and second resonant tank. The power supply device further has a controller for controlling the first and second switching device. The controller operates at least one of a first switching device independently from the operating conditions of a second switching device. The controller operates the second switching device depending on the operating conditions of the first switching device.

20 Claims, 13 Drawing Sheets

POWER SUPPLY DEVICE FOR A HOUSEHOLD APPLIANCE AND AN OPERATING METHOD THEREOF

The present invention relates to a power supply device for supplying electric power to a household appliance.

In a further aspect, the present invention relates to a method for operating a power supply device for a household appliance.

As is known, a power supply device for a household appliance, such as a cook-top or a microwave oven, generally comprises an AC-AC switching converter.

The switching converter may have different topologies, according to the needs.

Quasi-Resonant (Q-R) converters are widely used in these applications, since they can adjust their switching frequency or duty-cycle so that switching constantly occurs in zero voltage/current conditions ("soft switching conditions").

Further, they are generally characterised by a relatively simple circuit structure.

On the other hand, Q-R converters are generally not suitable to operate in a synchronous manner over a same period.

The switching converter of a power supply device typically includes a switching device for providing a feeding current having adjustable frequency and amplitude to a resonant tank, which comprises a resonant capacitor and an inductive load, such as the induction coil of a cook-top or the primary winding of a transformer feeding a magnetron device.

As is known, said switching device is operated with a switching period that comprises a conduction period, in which said switching device allows the flow of a current between a bus capacitor and the resonant tank (non-resonating phase), and an interruption period, in which said switching device blocks the flow of current between the bus capacitor and the resonant tank, thereby allowing the resonant tank to exchange energy only at local level, basically between the resonant capacitor and the inductive load (resonating phase).

Power supply devices are known, in which the switching converter comprises two or more switching devices that concurrently feed a same load.

In some known solutions, said switching devices are operated according to a so-called "phased mode", which foresees that their conduction periods start synchronously.

In other solutions, said switching devices are operated according to a so-called "interleaved mode", which foresees that their conduction periods start at staggered instants, so that they do not overlap or are minimally overlapped.

Traditional power supply devices have some drawbacks, which become quite remarkable when multiple loads have to be fed.

In particular when multiple Q-R converters are used to feed multiple loads, the onset of inter-modulation noise might occur if the converters are oscillating at different frequencies.

On the other hand, forcing a plurality of switching devices of a Q-R converter to operate at a same frequency might cause irreversible faults in some unfavourable load conditions.

Traditional power supply devices are often characterised by a circuit structure, which has remarkable limitations in terms of reliability and robustness to faults.

Further, they are relatively expensive to produce at industrial level.

The main aim of the present invention is to provide a power supply device for a household appliance, and an operating method thereof, which allows overcoming of the drawbacks mentioned above.

Within this aim, it is an object of the present invention to provide a power supply device, and an operating method thereof, which allows a reliable feeding of multiple loads.

A further object of the present invention is to provide a power supply device, and an operating method thereof, which can be implemented using relatively simple and cheap circuitries and control techniques.

A further object of the present invention is to provide a power supply device, which is easy to manufacture at industrial level, at competitive costs.

Thus, the present invention provides a power supply device for a household appliance, according to the following claim 1 and the related dependent claims.

In a further aspect, the present invention relates to a method for operating a power supply device for a household appliance, according to the following claim 8 and the related dependent claims.

Further features and advantages of the present invention will become apparent from the following description of preferred embodiments, taken in conjunction with the drawings, in which.

Figure 1:
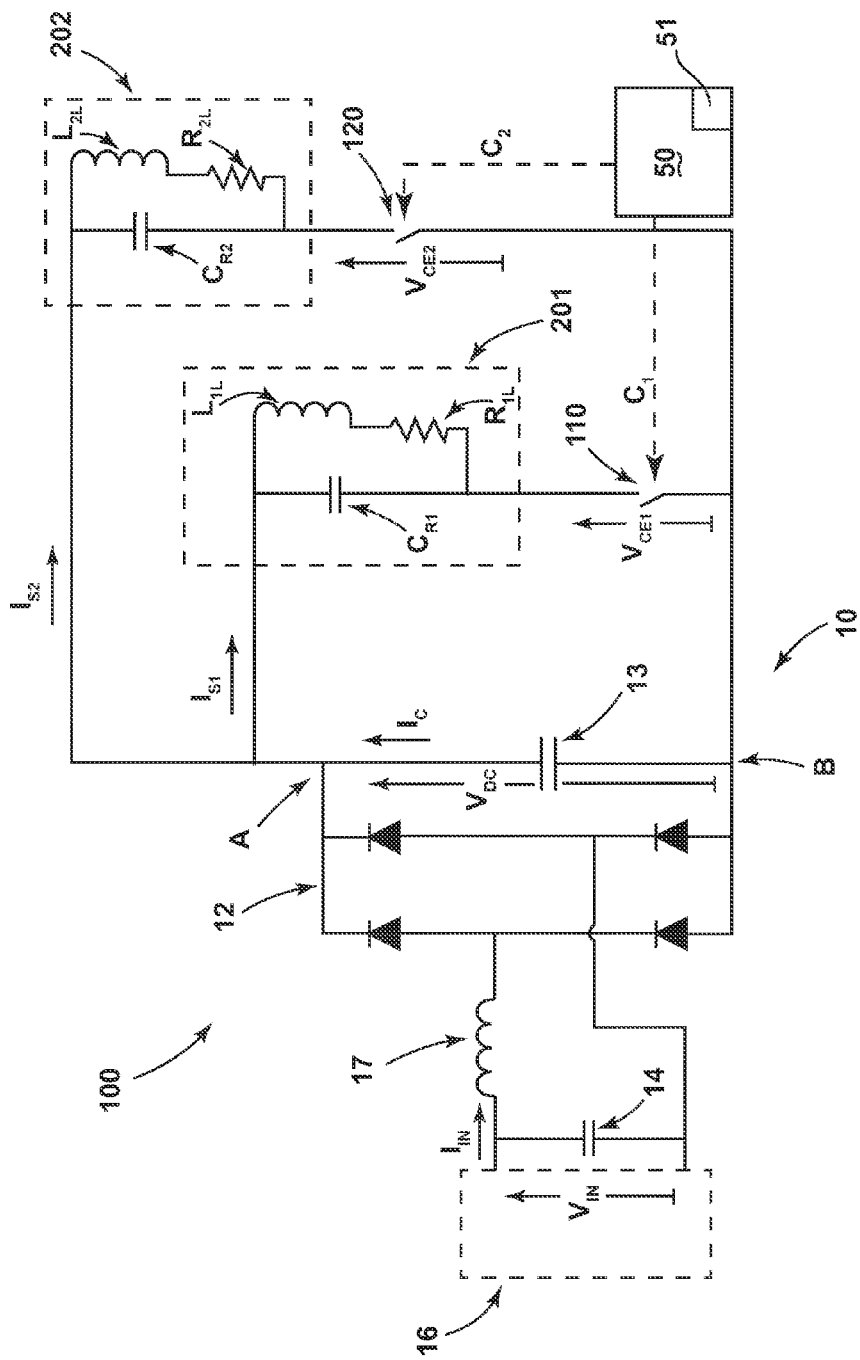
FIG. 1 shows a schematic diagram of an embodiment of the power supply device, according to the invention.

Referring now to the cited figures, the present invention relates to a power supply device 100 for a household appliance, in this case an induction hob.

The power supply device 100 is electrically connectable with the mains 16, from which it receives an input voltage $V_{IN}$ and an input current $I_{IN}$, which are periodic electric quantities having mains semi-cycles of predefined duration. As an example, the duration of the mains semi-cycle is fixed at 10 ms in 50 Hz electric power distribution networks.

The power supply device 100 comprises a switching converter 10 that is electrically connected with the mains 16.

Preferably, the switching converter 10 is of the Quasi-Resonant type (Q-R) and is structured as two Q-R converters sharing a common DC-bus.

The switching converter 10 thus comprises a rectifying stage 12, for example a diode bridge, which is electrically connected with the mains 16 to receive the input voltage $V_{IN}$ and output a rectified voltage $V_{DC}$.

The switching converter 10 preferably comprises also an input filtering stage that comprises a filtering inductor 17, which is electrically connected in series with one of the mains terminals.

A bus capacitor 13, which is electrically connected in parallel with the output terminals of said rectifying stage 12, is part of said filtering arrangement.

Preferably, said filtering stage comprises also a further filtering capacitor 14, electrically connected in parallel with the mains terminals.

The bus capacitor 13 is of a non-smoothing type, i.e. it has a relatively small capacitance value, so that the cut-off frequency of the filtering arrangement formed by the inductor 17 and the capacitor 13 is quite higher than the mains frequency.

The bus voltage $V_{DC}$ across the terminals A, B of the bus capacitor 13 thus substantially follows the behaviour of the rectified voltage provided by the rectifying stage 12, with fluctuations having a period equal to the half of a mains cycle $T_{mains}$.

At least a terminal A, B of the bus capacitor 13 is electrically connected with a first and second resonant tank 201, 202, each of which may comprise an inductive-resistive load, schematically represented by a load inductance $L_{1L}$, $L_{2L}$ and a load resistance $R_{1L}$, $R_{2L}$.

Each of said inductive-resistive loads may be, for example, a pancake coil of an induction cook-top powered by the power supply device 100.

Each resonant tank 201, 202 may further comprise a resonant capacitor $C_{R1}$, $C_{R2}$ that is generally electrically connected in parallel with the corresponding inductive-resistive load.

The switching converter 10 comprises a first and second switching device 110, 120 (for example a reverse conducting IGBT switch), each of which is advantageously electrically connected with the corresponding resonant tank 201, 202.

Each of the switching devices 110, 120 may be arranged, so as to be connected in series with the corresponding resonant tank 201, 202, as shown in the embodiment of FIG. 1.

In other embodiments of the present invention, the switching devices 110, 120 may be differently connected with the components of the resonant tanks 201, 202.

For example, they may be connected in series with the respective inductive-resistive loads $L_{1L}, R_{1L}, L_{1L}, R_{1L}$ and in parallel with the respective resonant capacitors $C_{R1}, C_{R2}$.

The power supply device 100 comprises control means 50 for controlling the operation of the first and second switching device 110, 120.

The control means 50 advantageously comprise a control loop (not shown) for controlling the operation of the first and second switching device 110, 120 by means of properly generated first and second control signals $C_1$, $C_2$.

The mentioned control loop may comprise first and second sensors (not shown) capable of providing signals indicative of the behaviour of one or more electric quantities related to the operation of the first and second switching device 110, 120, respectively.

The mentioned control loop may further comprise a controller 51 of digital or analogue type that generates the control signals $C_1$, $C_2$ for controlling the operation of the switching devices 110, 120.

Preferably, the mentioned control loop is implemented in a digital form. In this case, the first and second sensors are operatively associated with sampling means capable of providing digital samples of the detected electric quantities to the controller 51, which may advantageously comprise a microprocessor or another digital processing device.

The control means 50 advantageously operate the first switching device 110 with a first switching period $T_1$ that comprises a first conduction period $T_{ON1}$, in which the switching device 110 in an conductive state and allows the flow of a first current $I_{S1}$ between the bus capacitor 13 and the resonant tank 201, and a first interruption period $T_{OFF1}$, in which the switching device 110 is in an interdiction state and blocks the flow of the current $I_{S1}$.

It is understood that the portion of time in which the current $I_{S1}$ flows in the freewheeling diode of the IGBT switch 110 is part of the conduction period $T_{ON1}$.

Similarly, the control means 50 operate the second switching device 120 with a second switching period $T_2$ that comprises a second conduction period $T_{ON2}$, in which the switching device 120 in an conductive state and allows the flow of a second current $I_{S2}$ between the bus capacitor 13 and the resonant tank 202, and a second interruption period $T_{OFF2}$, in which the switching device 120 is in an interdiction state and blocks the flow of the current $I_{S2}$.

It is understood that the portion of time in which the current $I_{S2}$ flows in the freewheeling diode of the IGBT switch 120 is part of the conduction period $T_{ON2}$.

At the respective conduction period $T_{ON1}$, $T_{ON2}$ (non-resonating phase), each switching device 110, 120 allows the exchanging of electric energy between the bus capacitor 13 and the corresponding resonant tank 201, 202.

At the respective interruption period $T_{OFF1}$, $T_{OFF2}$ (resonating phase), each switching device 110, 120 is open and one of the terminals of the corresponding resonant tank 201, 202 is floating.

In this case, an exchange of energy occurs only at the level of each resonant tank 201, 202, namely between each inductive-resistive load and the corresponding resonant capacitor.

From the above, it is apparent how the exchange of energy between the bus capacitor 13 and each resonant tank 201, 202 is alternatively allowed/blocked by the respective switching device 110, 120.

According to the invention, the control means 50 normally operate the switching device 110 substantially independently from the operating conditions of the switching device 120, so that one or more first electric quantities $V_{CE1}$, $I_{S1}$, $P_{IN1}$, which are related to the operating conditions of the switching device 110, follow corresponding first reference waveforms and or values.

In other words, in normal conditions the switching device 110 works as a "master device", the operation of which is established by the control means 50 on the base of the first electric quantities $V_{CE1}$, $I_{S1}$, $P_{IN1}$ and it is normally not conditioned by the operating conditions of the switching device 120.

The terms "normally" or "normal conditions" are intended to refer to operative conditions of the power supply device 100, in which no fault events (e.g. due to over-current phenomena and/or over-voltage phenomena, and the like) are present or are arising.

The switching device 110 works in normal conditions for most of its switching periods $T_1$.

When fault events arise in the power supply 100, the operation of the switching device 110 may be conditioned by the operating conditions of the switching device 120.

While the switching device 110 normally works substantially independently from the operating conditions of the switching device 120, the control means 50 operate the switching device 120 mainly depending on the operating conditions of the switching device 110, in practice as a "slave device", the operation of which substantially follows the switching period T1 that is defined for the switching device 110.

According to the invention, the control means 50 operate the second switching device 120 so that the switching devices 110, 120 work according to an interleaved mode and the switching period $T_2$ is kept constantly equal to the switching period $T_1$.

Figure 2:
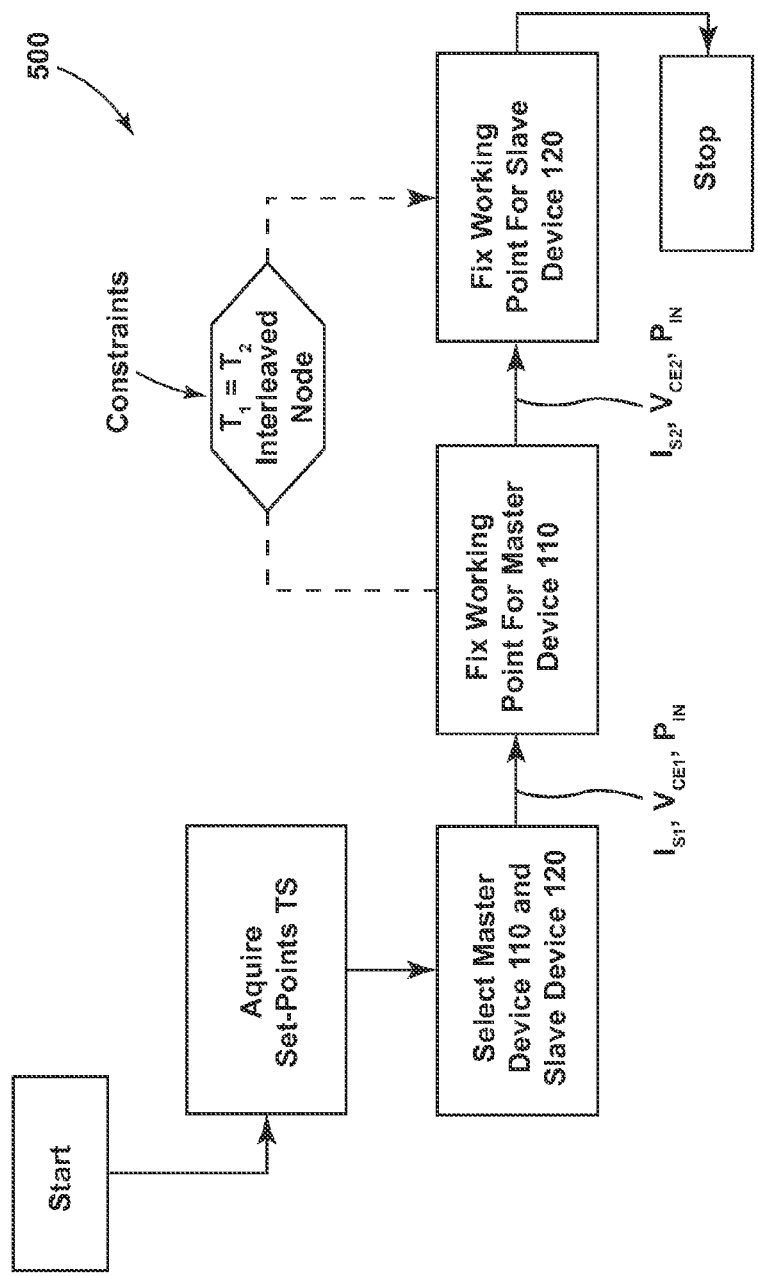
FIG. 2-6, 7A-7C, 8-9, 10A-10C show schematic diagrams related to the operation of the power supply device, according to the invention, and to the implementation of the operating method thereof.
Figure 3:
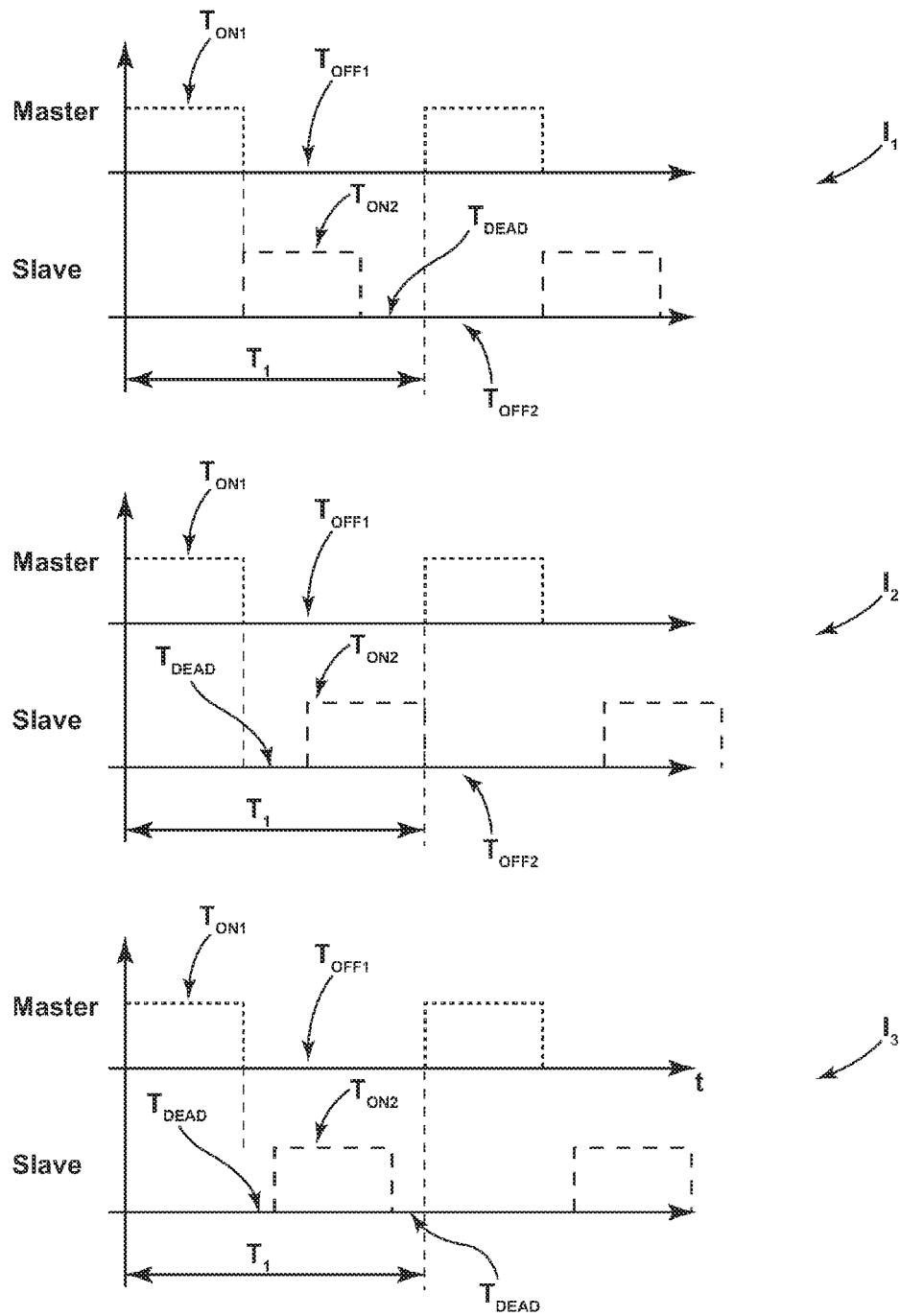
Figure 4:
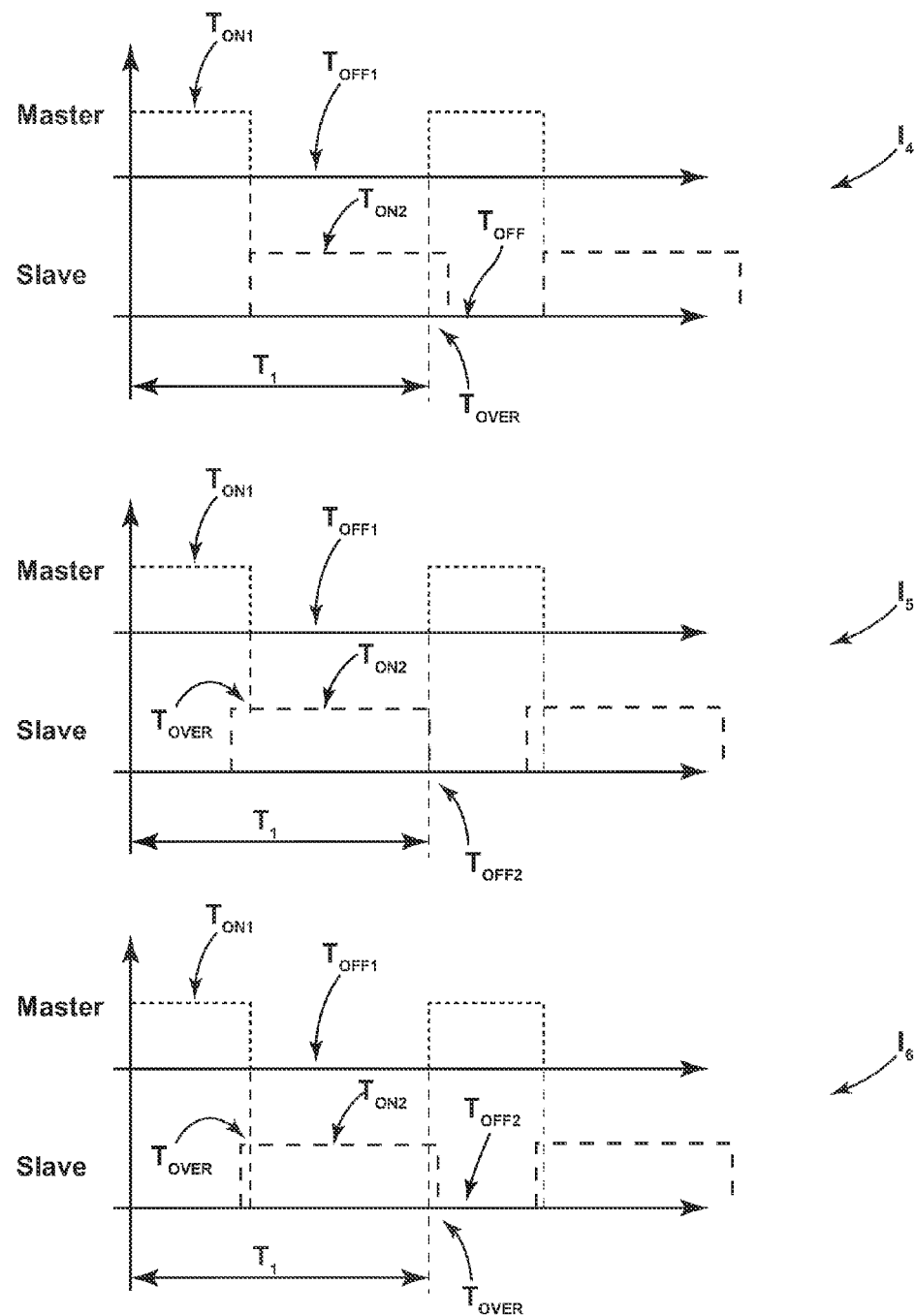

In FIGS. 2-4, an exemplary control procedure 500 that can be followed by the control means 50 is schematically shown.

At each generic sampling instant (k), the control means 50 acquire the requested set points for the operation of the switching converter 10 (step 501).

Then, the control means 50 determine which one of the switching devices of the switching converter 10 is the "master device" and the "slave device" (step 502).

In general, the control means 50 do not assign the role of "master device" or "slave device" in a predefined manner.

The role of "master device" or "slave device" is preferably assigned by the control means 50 in a dynamic manner on the basis of the power (or current) set points requested for the switching converter 10.

Preferably, the control means 50 assign the role of "master device" to the switching device 110 that would meet the requested power (or current) set points at the lowest switching frequency if it were operated alone.

This means that the switching device 120 selected as "slave device" would deliver more power than requested if operated at the switching frequency of the switching device selected as "master device".

The switching device 120 selected as "slave device" can thus be kept in an interdiction state for some time to satisfy the requested power (or current) set points.

In normal conditions, the control means 50 regulate the operation of the switching device 110 (master device) according to the needs, in particular mainly with the aims of achieving the requested set points.

In particular, the control means 50 regulate the operation of the switching device 110 so that one or more first electric quantities $V_{CE1}$, $I_{S1}$, $P_{IN1}$ related to the operation of said device follow corresponding reference waveforms and/or values.

Conveniently, the operating quantities that are taken into consideration by the control means 50 for operating the switching device 110 are the voltage $V_{CE1}$ across the terminals of the switching device 110 and/or the current $I_{S1}$ flowing through this latter and/or the power drained from the mains $P_{IN1}$ during the switching period $T_1$.

The control means 50 thus calculate the first control quantities $T_1$, $T_{ON1}$, $T_{OFF1}$, $f_1=1/T_1$ in order to bring the switching device 110 to working points that are as closest as possible to the requested set points and generate the control signals $C_1$ in order to operate the switching device 110 according to said first control quantities.

The control means 50 regulate the operation of the switching device 120 (slave device) on the base of the operating conditions of the switching device 110, in particular mainly with the aim of satisfying the following operative conditions:

the switching devices 110, 120 must operate in an interleaved mode;
the switching period $T_2$ of the switching device 120 must be equal to the switching period $T_1$ of the switching device 110.

Within the framework of the present invention, it is intended that two switching devices operate in an interleaved mode, if the conduction periods $T_{ON1}$, $T_{ON2}$ do not mutually overlap or overlap for time intervals $T_{OVER}$, the total duration of which is relatively short with respect to the duration of the switching period $T_1=T_2$.

During the time intervals $T_{OVER}$ both the switching devices 110, 120 are in a conduction state.

The total duration of the time intervals $T_{OVER}$ is equal to the difference between the sum of the two conduction periods $T_{ON1}$, $T_{ON2}$ and the switching period $T_1$ ($T_1=T_2$), i.e. $T_{OVER}=(T_{ON1}+T_{ON2})-T_1$.

Therefore, after having established the most proper working point for the switching device 110 (master), the control means 50 calculate the second control quantities $T_2$, $T_{ON2}$, $T_{OFF2}$, $f_2=1/T_2$ in order to bring the switching device 110 to working points that satisfy the above mentioned operative conditions established for the "slave device".

The control means 50 generate the control signals $C_2$ in order to operate the switching device 120 according to said second control quantities.

The control means 50 preferably operate the switching device 120 with the aim of achieving the requested set points, when the operative conditions established for the "slave device" are satisfied.

In particular, when it is possible, the control means 50 regulate the operation of the switching device 120 so that one or more second electric quantities $V_{CE2}$, $I_{S2}$, $P_{IN2}$ related to the operation of said first switching device follow corresponding second reference waveforms and/or values.

Conveniently, the operating quantities that are taken into consideration by the control means 50 for operating the switching device 120 are the voltage $V_{CE2}$ across the terminals of the switching device 120 and/or the current $I_{S2}$ flowing through this latter and/or the power drained from the mains $P_{IN2}$ during the switching period $T_2$.

The procedure is then repeated at the next sampling period (k+1).

In FIGS. 3-4, some possible scenarios for the interleaved operation of the switching devices 110 (master) and 120 (slave) are shown.

In the interleaved operation modes I1-I3 shown in FIG. 3, the sum of the two conduction periods $T_{ON1}$, $T_{ON2}$ is shorter than the switching period $T_1$, i.e. $T_{ON1}+T_{ON2}<T_1$.

Thus, no time intervals $T_{OVER}$ are present but it is possible to identify time intervals $T_{DEAD}$ during which both the switching devices 110, 120 are in an interdiction state.

The time intervals $T_{DEAD}$ are distributed depending on the starting instants of the conduction periods $T_{ON1}$, $T_{ON2}$.

In the interleaved operation modes I4-I6 shown in FIG. 4, the sum of the two conduction periods $T_{ON1}$, $T_{ON2}$ is longer than the switching period $T_1$, i.e. $T_{ON1}+T_{ON2}>T_1$.

In this case, it is possible to notice the presence of time intervals $T_{OVER}$, which are distributed depending on the starting instants of the conduction periods $T_{ON1}$, $T_{ON2}$.

Figure 5:
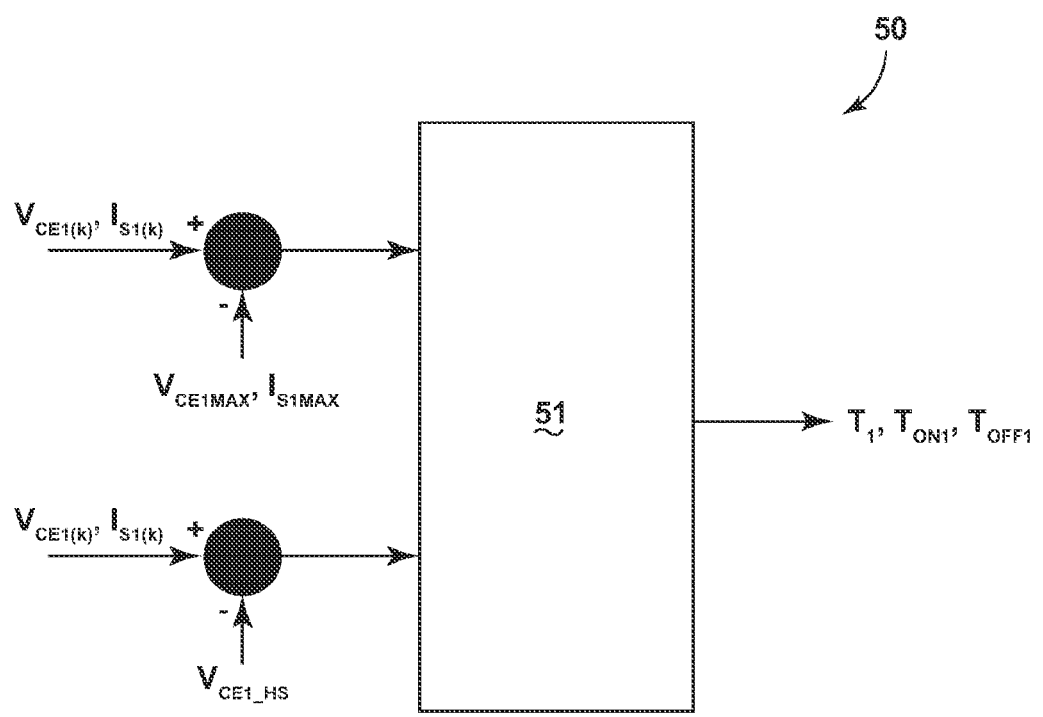

Preferably, while adjusting the working point of the switching device 110, the control means 50 operate this latter, so that certain electric quantities vary within first predefined reference limits and the switching device 110 can work in safe conditions (FIG. 5).

As mentioned above, the operating quantities that are taken into consideration by the control means 50 for operating the switching device 110 are the voltage $V_{CE1}$ across the terminals of the switching device 110 and/or the current $I_{S1}$ flowing through this latter and/or the power drained from the mains $P_{IN1}$ during the switching period $T_1$.

Preferably, the mentioned first reference limits are defined by first threshold values $V_{CE1MAX}$, $I_{S1MAX}$ which respectively represent the maximum values admitted for the voltage $V_{CE1}$ and for the current $I_{S1}$ during the switching period $T_1$ and at the turn-on of the switching device 110 in order to ensure a safe operation of this latter.

The mentioned first reference limits are advantageously stored or run-time uploaded by the control means 50 according to the stress levels set for the switching converter 10.

Preferably, the control means 50 operate the switching device 110, so that the switching device 110 works in soft switching conditions.

Within the framework of the present invention, it is intended that a switching device operates in soft switching conditions, if the voltage across it and/or the current flowing through it is null at the instant of the commutation.

The switching device 110 thus works in soft switching conditions, if the voltage $V_{CE1}$ is substantially equal to zero (in particular lower than a predefined threshold value $V_{CE1\_HS}$), at the beginning of each conduction period $T_{ON1}$, when the switching device 110 is turned on.

In order to operate the switching device 110, the control means 50 may intervene on the switching period $T_1$, the conduction period $T_{ON1}$ and/or the interruption period $T_{OFF1}$.

Of course, other control variables such as the switching frequency $f_1=1/T_1$ or the duty-cycle may be adopted.

Preferably, the control means 50 adjust the conduction period $T_{ON1}$ and calculate the interruption period $T_{OFF1}$ and the switching period $T_1$ on the base of the value established for the conduction period $T_{ON1}$.

To this aim, the control means 50 may adopt different control procedures, according to the needs.

Figure 6:
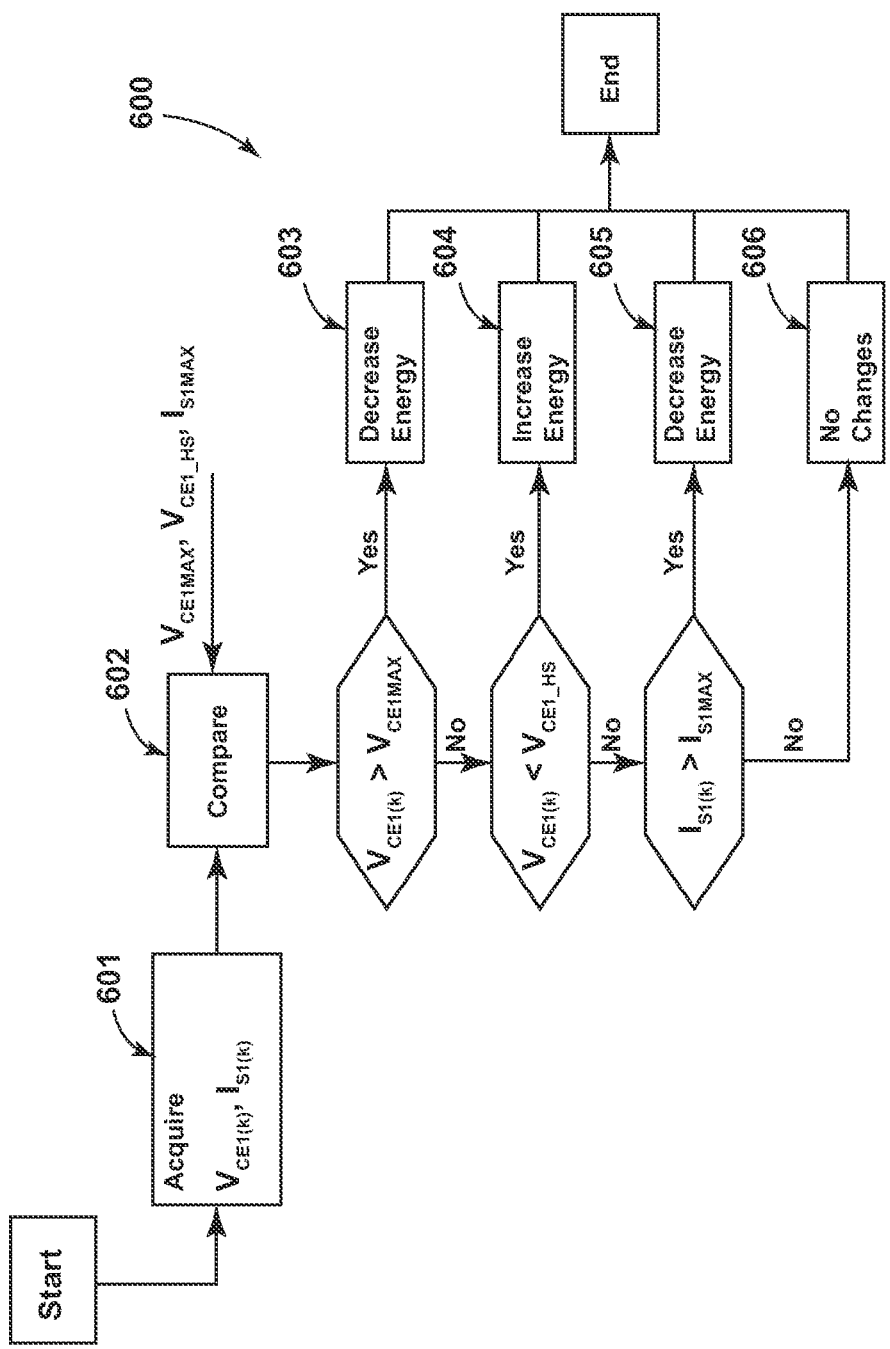

An example of control procedure 600 that may be adopted by the control means 50 is shown in FIG. 6.

At the generic sampling period k, the control procedure 600 comprises the step 601 of acquiring data related to the quantities $V_{CE1}$, $I_{S1}$.

At the step 602, the acquired data $V_{CE1}(k)$, $I_{S1}(k)$ are compared with the stored threshold values $V_{CE1MAX}$, $V_{CE1\_HS}$ and $I_{S1MAX}$.

Figure 11:
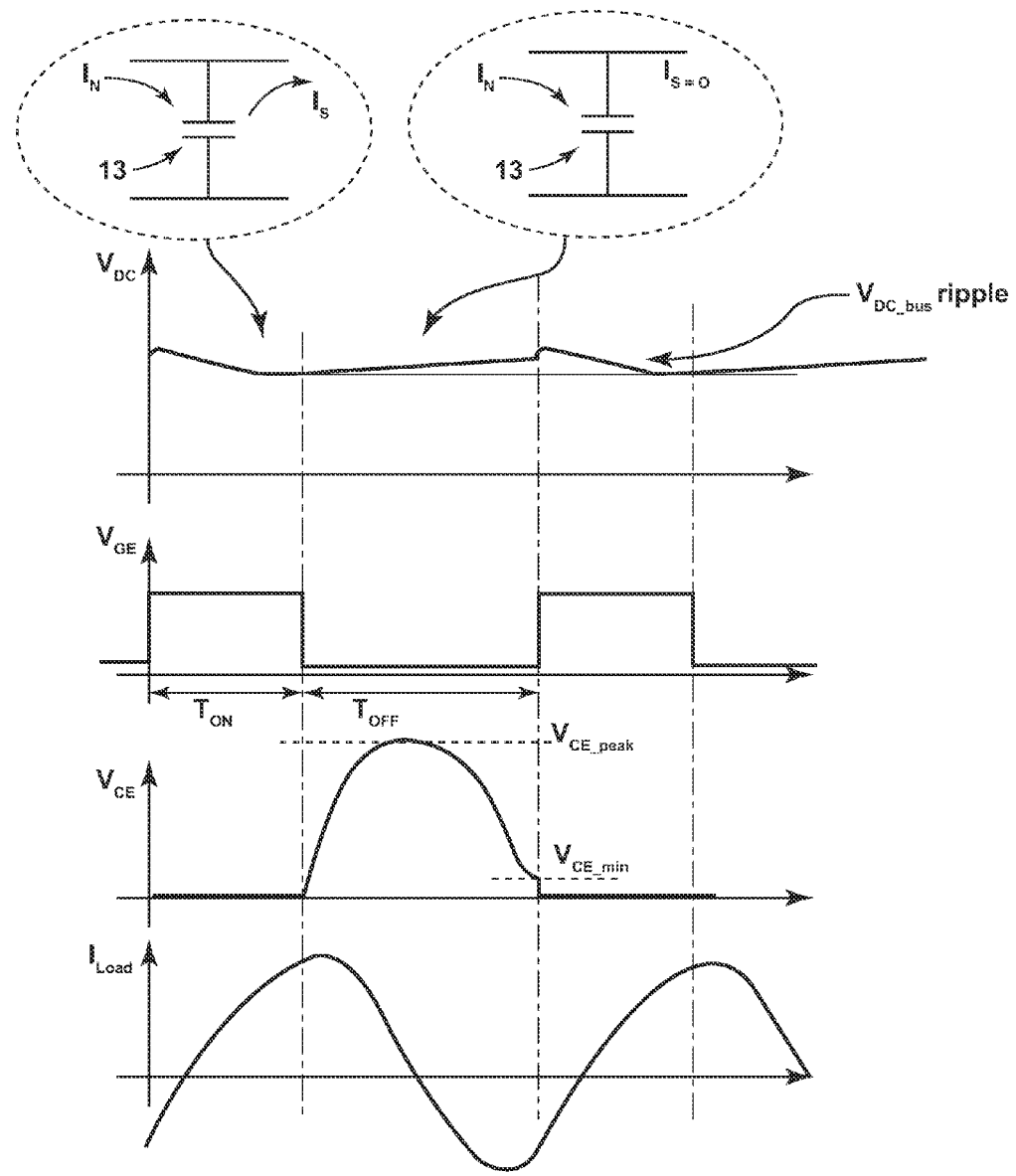
FIG. 11 shows the typical oscillating-damped behaviour of a Q-R converter during the charge and discharge phases of the resonant capacitor.

If the voltage $V_{CE1}(k)$, which has an oscillating damped behaviour as shown in FIG. 11, at it's maximum resonance peak value $V_{CE\_peak}$ exceeds the maximum threshold value $V_{CE1MAX}$, the conduction period $T_{ON1}$ for the sampling instant k+1 is reduced so as to reduce the electric energy transferred to the resonant tank 201 (step 603).

If the voltage $V_{CE1}(k)$ at it's minimum resonance value $V_{CE\_min}$ (which is lower than the maximum threshold value $V_{CE1MAX}$), becomes lower than a minimum voltage threshold value $V_{CE1\_HS}$, the conduction period $T_{ON1}$ at for the sampling instant k+1 is increased, so as to increase the electric energy transferred to the resonant tank 201 (step 604).

If the voltage $V_{CE1}(k)$ is lower than the threshold values $V_{CE1MAX}$, or higher than $V_{CE1\_HS}$ but the current $I_{S1}(k)$ exceeds the threshold value $I_{S1MAX}$, the conduction period $T_{ON1}$ for the sampling instant k+1 is re-calculated, so as to reduce the electric energy transferred to the resonant tank 201 (step 605).

If none of the aforementioned conditions is met, the conduction period $T_{ON1}$ for the instant k+1 is adjusted by a usual closed control loop logic, such as a known PID controller.

Figure 7A:
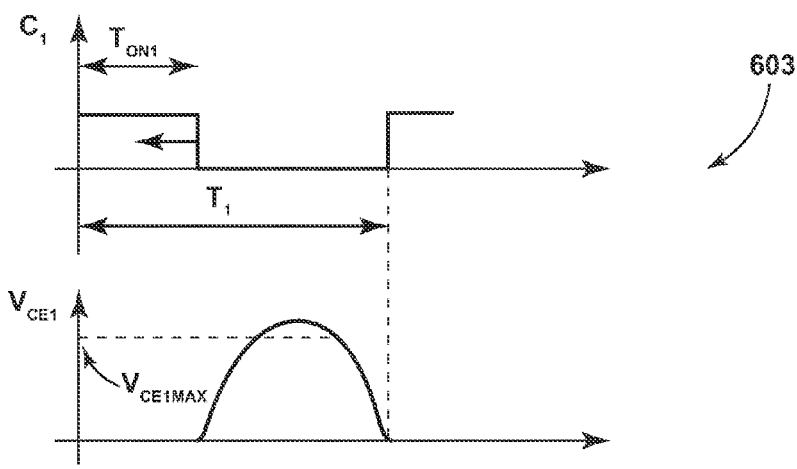
Figure 7B:
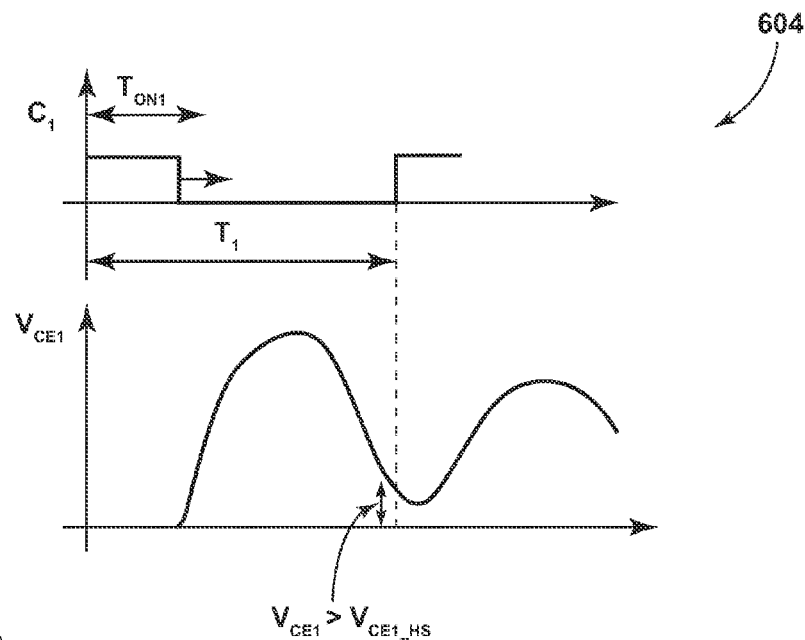
Figure 7C:
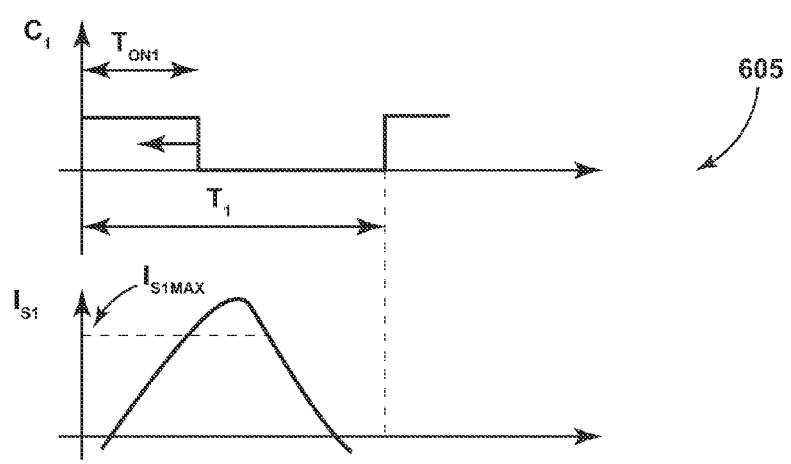

The diagrams of FIGS. 7A-7C schematically show the intervention of the control means 50 at the steps 603, 604, 605 of the procedure 600.

At the steps 603, 605, control signals C1 are generated to shorten the conduction period $T_{ON1}$ and decrease the energy transferred to the resonant tank 201, while at the step 604 control signals C1 are generated to prolong the conduction period $T_{ON1}$ and increase the energy transferred to the resonant tank 201.

Figure 8:
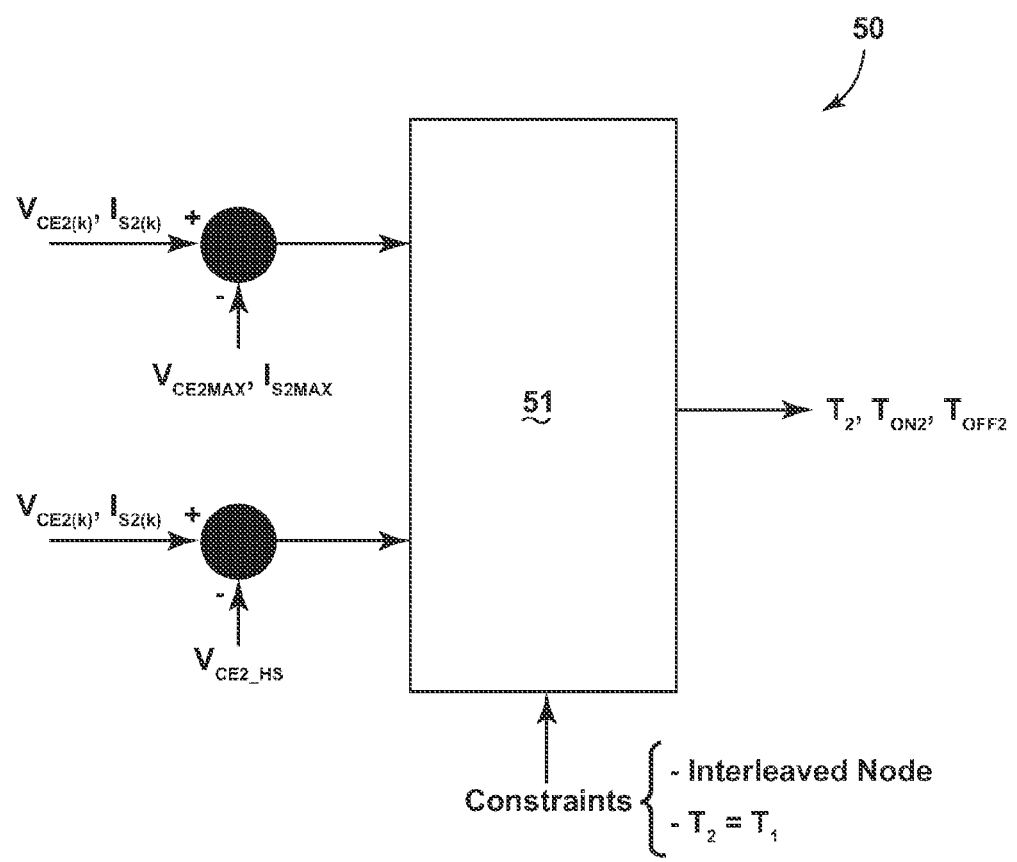

Preferably, while adjusting the working point of the switching device 120, the control means 50 operate this latter, so that certain electric quantities vary within second predefined reference limits and the switching device 120 can work in safe conditions (FIG. 8).

As mentioned above, the operating quantities that are taken into consideration by the control means 50 for operating the switching device 120 are the voltage $V_{CE2}$ across the terminals of the switching device 110 and/or the current $I_{S2}$ flowing through this latter and/or the power drained from the mains $P_{IN2}$ during the switching period $T_2$.

Preferably, the mentioned second reference limits are defined by second threshold values $V_{CE2MAX}$, $I_{S2MAX}$ which respectively represent the maximum values admitted for the voltage $V_{CE2}$ and for the current $I_{S2}$ during the switching period $T_2$ and at the turn-on of the switching device 120 in order to ensure a safe operation of this latter.

The mentioned second reference limits are advantageously stored or run-time uploaded by the control means 50 according to the stress levels set for the switching converter 10.

Preferably, the control means 50 operate the switching device 110, so that the switching device 110 works in soft switching conditions.

The switching device 120 works in soft switching conditions, if the voltage $V_{CE2}$ is substantially equal to zero (in particular lower than a predefined threshold value $V_{CE2\_HS}$), at the beginning of each conduction period $T_{ON2}$, when the switching device 120 is turned on.

In order to operate the switching device 120, the control means 50 may intervene on the switching period $T_2$, the conduction period $T_{ON2}$ and/or the interruption period $T_{OFF2}$.

Of course, other control variables such as the switching frequency $f_2=1/T_2$ or the duty-cycle may be adopted.

Preferably, the control means 50 adjust the conduction period $T_{ON2}$ and calculate the interruption period $T_{OFF2}$ and the switching period $T_2$ on the base of the value established for the conduction period $T_{ON2}$.

To this aim, the control means 50 may adopt different control procedures, according to the needs.

Figure 9:
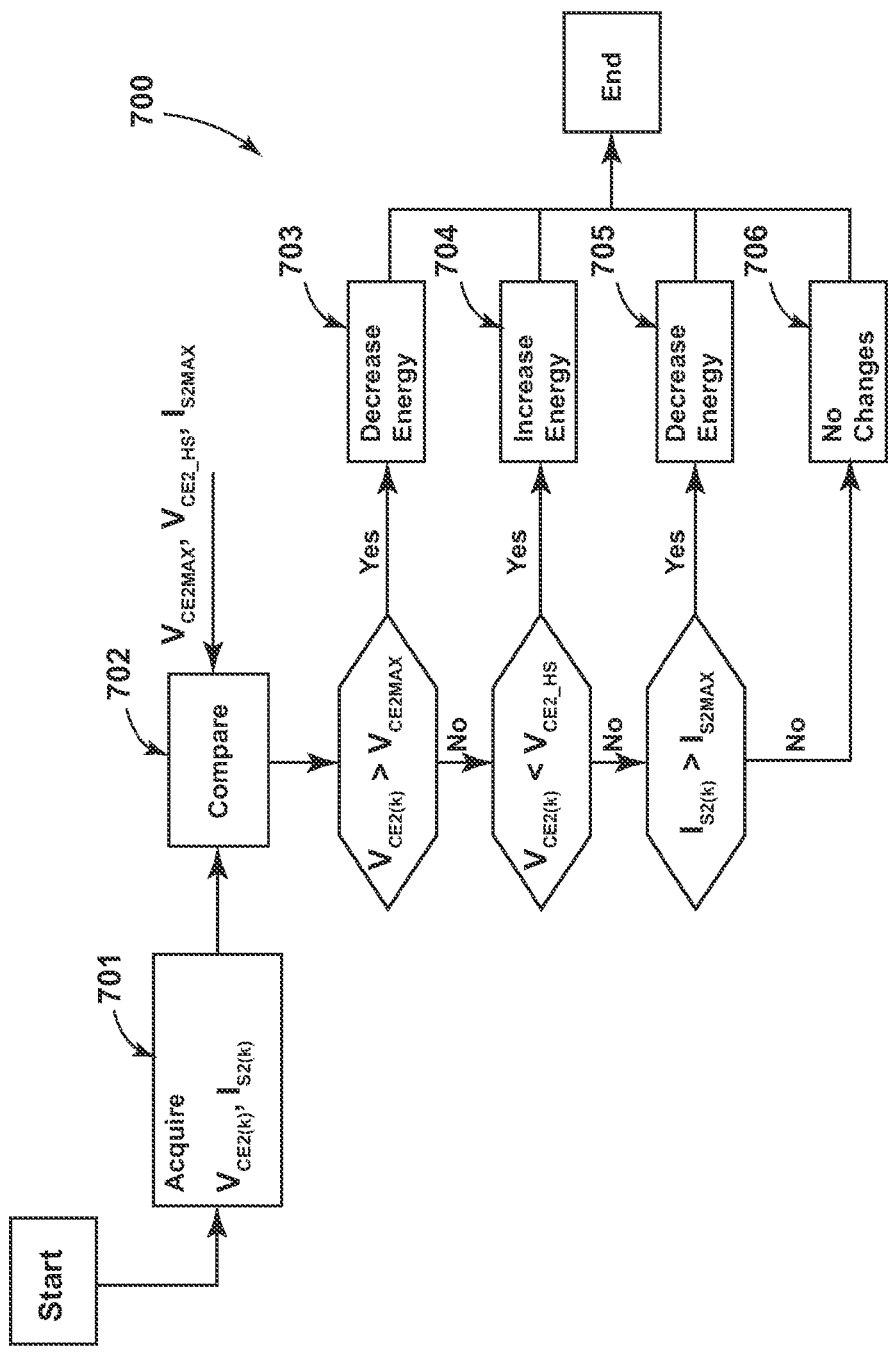

An example of control procedure 700 that may be adopted by the control means 50 is shown in FIG. 9.

At the generic sampling period k, the control procedure 700 comprises the step 701 of acquiring data related to the quantities $V_{CE2}$, $I_{S2}$.

At the step 702, the acquired data $V_{CE2}(k)$, $I_{S2}(k)$ are compared with the stored threshold values $V_{CE2MAX}$, $V_{CE2\_HS}$ and $I_{S2MAX}$.

If the voltage $V_{CE2}(k)$ exceeds the threshold value $V_{CE2MAX}$, the conduction period $T_{ON2}$ for the sampling instant k+1 is re-calculated, so as to reduce the electric energy transferred to the resonant tank 202 (step 703).

If the voltage $V_{CE2}(k)$ is lower than the threshold value $V_{CE2MAX}$ but it exceeds the voltage threshold value $V_{CE2\_HS}$, the conduction period $T_{ON2}$ at for the sampling instant k+1 is re-calculated, so as to increase the electric energy transferred to the resonant tank 202 (step 704).

If the voltage $V_{CE2}(k)$ is lower than the threshold values $V_{CE2MAX}$, $V_{CE2\_HS}$ but the current $I_{S2}(k)$ exceeds the threshold value $I_{S2MAX}$, the conduction period $T_{ON2}$ for the sampling instant k+1 is re-calculated, so as to reduce the electric energy transferred to the resonant tank 202 (step 705).

If none of the stored threshold values is exceeded, the conduction period $T_{ON2}$ for the instant k+1 is equal to the one calculated for the sampling instant k (step 706).

Figure 10A:
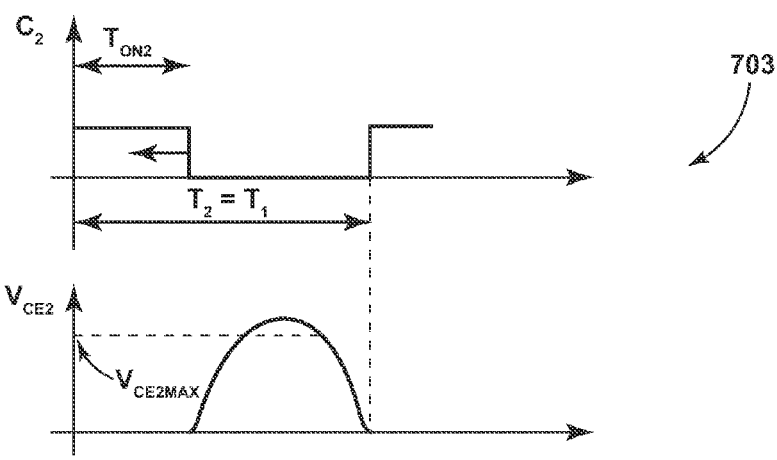
Figure 10B:
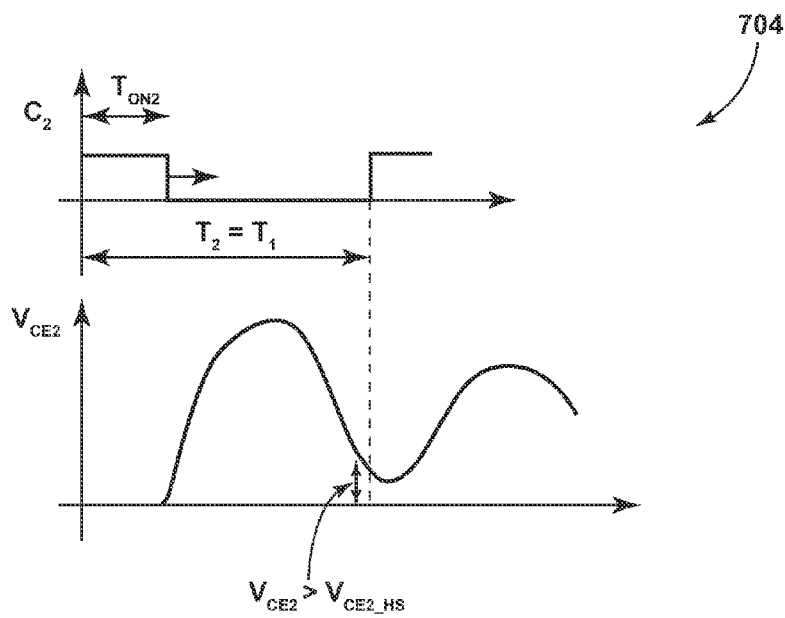
Figure 10C:
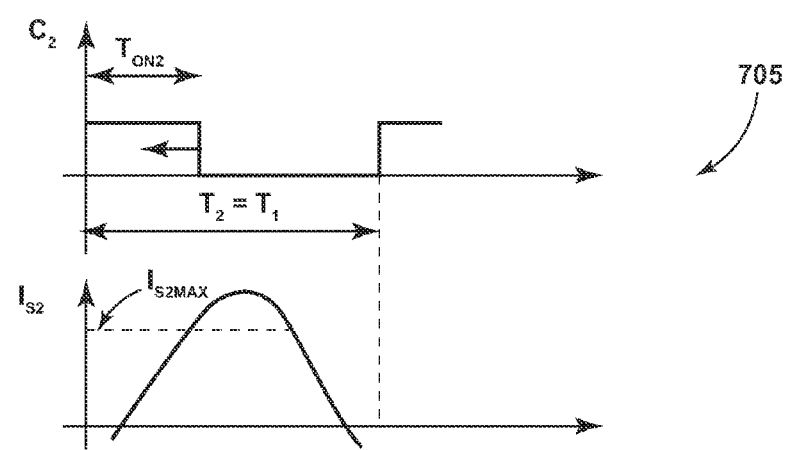

The diagrams of FIGS. 10A-10C schematically show the intervention of the control means 50 at the steps 703, 704, 705 of the procedure 700.

At the steps 703, 705 control signals $C_2$ are generated to shorten the conduction period $T_{ON2}$ and decrease the energy transferred to the resonant tank 202, while at the step 704 control signals $C_2$ are generated to prolong the conduction period $T_{ON2}$ and increase the energy transferred to the resonant tank 202.

From the above, it is apparent that the present invention relates, in a further aspect, a method for operating the power supply device 100.

The method, according to the invention, comprises the steps of:
- operating the switching device 110 independently from the operating conditions of the switching device 120 and so that one or more first electric quantities $V_{CE1}$, $I_{S1}$, $P_{IN1}$ related to the operation of the first switching device 110 follow first corresponding reference waveforms and/or values;
- operating the switching device 120 depending on the operating conditions of the switching device 110 and so that the switching devices 110, 120 operate according to an interleaved mode and the second switching period $T_2$ is kept constantly equal to the first switching period $T_1$.

Preferably, the method comprises the step of operating the step of operating the switching device 110, so that one or more first electric quantities $V_{CE1}$, $I_{S1}$, $P_{IN1}$ related to the operation of this latter vary within first predefined reference limits $V_{CE1MAX}$, $I_{S1MAX}$.

Preferably, the method comprises the step of operating the switching device 110, so that this latter works in soft switching conditions.

Preferably, the switching device 110 is operated by adjusting the conduction period $T_{ON1}$ of the switching period $T_1$.

Preferably, the method comprises the step of operating the switching device 120, so that so that one or more second electric quantities $V_{CE2}$, $I_{S2}$, $P_{IN2}$ related to the operation of this latter follow corresponding second reference waveforms and/or values.

Preferably, the method comprises the step of operating the switching device 120, so that one or more second electric quantities $V_{CE2}$, $I_{S2}$, $P_{IN2}$ related to the operation of this latter vary within second predefined reference limits $V_{CE2MAX}$, $I_{S2MAX}$.

Preferably, the method comprises the step of operating the switching device 120, so that this latter works in soft switching conditions.

Preferably, the switching device 120 is operated by adjusting the conduction period $T_{ON2}$ of the switching period $T_2$.

The power supply device 100, and the operating method thereof, according to the present invention, fully allows the achievement of the intended aims and objects.

The power supply device 100, and the operating method thereof, allows to operating the switching devices 110, 120 in a coordinated manner.

It is therefore possible to operate the switching devices 110, 120, so as to decrease the electrical stresses on the active and passive components (in particular on the bus capacitor 13), prevent electrical faults on the switching devices and, more generally, increase the robustness to grid faults.

The power supply device 100, and the operating method thereof, allows achieving higher levels of power, reducing the interference noise injected into the mains, reducing the inter-modulation noise and increasing the overall efficiency of the power supply to the household appliance.

The power supply device, and the operating method thereof, according to the invention, has a relatively simple circuit structure and it is relatively easy and relatively cheap to manufacture at industrial level.

The invention claimed is:

1. A household appliance power supply device comprising:
    - a switching converter that comprises a rectifying stage, electrically connected with a main power supply;
    - a bus capacitor electrically connected in parallel with at least one output terminal electrically connected with the rectifying stage;
    - a first resonant tank and second resonant tank electrically connected with at least a terminal of the bus capacitor;
    - a first switching device and a second switching device, which have respectively a first switching period and a second switching period and are electrically connected respectively with the first resonant tank and the second resonant tank; and
    - a control means configured to control the first switching device and the second switching device;
    - wherein the control means is configured to operate the first switching device independently from an operating condition of the second switching device, so that at least one first electric quantity related to the operation of the first switching device follows at least one corresponding reference first waveform and a first reference value; and
    - wherein the control means is configured to operate the second switching device depending on an operating condition of the first switching device and based in part on a desired power output of the power supply device, so that the first switching device and the second switching device work according to an interleaved mode, the second switching period is kept constantly equal to the first switching period, and a delay between initiating operation of the first switching device and initiating operation of the second switching device is based in part on the desired power output of the power supply device.

2. The household appliance power supply device, according to claim 1, wherein the control means operates the first switching device, so that the at least one first electric quantity related to the operation of the first switching device varies within first predefined limits.

3. The household appliance power supply device, according to claim 1 wherein the control means operates the first switching device, so that the first switching device works in at least one soft switching condition.

4. The household appliance power supply device, according to claim 1, wherein the control means operates the second switching device, so that at least one second electric quantity related to the operation of the second switching device follows corresponding second reference waveform and second reference value.

5. The household appliance power supply device, according claim 4, wherein the control means operates the second switching device, so that the at least one second electric quantity related to the operation of the second switching device varies within second predefined limits.

6. The household appliance power supply device, according to claim 4, wherein the control means operates the second switching device, so that the second switching device works in soft switching conditions.

7. The power supply device, according to claim 1, wherein the main power supply provides an input voltage $V_{IN}$ and an input current $I_{IN}$.

8. The household appliance power supply device as in claim 1, wherein the control means initiates operation of the second switching device before the control means terminates operation of the first switching device.

9. The household appliance power supply device as in claim 1, wherein the control means initiates operation of the second switching device before the control means terminates operation of the first switching device when the desired power output of the power supply device is greater than a predetermined value.

10. The household appliance power supply device as in claim 1, wherein the control means initiates operation of the second switching device after the control means terminates operation of the first switching device when the desired power output of the power supply device is less than a predetermined value.

11. A household appliance comprising:
a power supply device comprising:
a switching converter that comprises a rectifying stage electrically connected with a main power supply;
a bus capacitor electrically connected in parallel with at least one output terminal electrically connected with the rectifying stage;
a first resonant tank and a second resonant tank electrically connected with at least a terminal of bus capacitor;
a first switching device has a first switching period and is electrically connected with the first resonant tank;
a second switching device which has a second switching period and is electrically connected with the second resonant tank; and
a control means configured to control the first switching device and the second switching device;
wherein the control means operates the first switching device independently from an operating condition of the second switching device, so that at least one first electric quantity related to the operation of the first switching device follows at least one corresponding reference first waveform, and a first reference value;
wherein the control means operates the second switching device depending on an operating condition of the first switching device and based in part on a desired power output of the power supply device, so that the first switching device and the second switching device work according to an interleaved mode and the second switching period is kept constantly equal to the first switching period, and a delay between initiating operation of the first switching device and initiating operation of the second switching device is based in part on the desired power output of the power supply device; and
wherein the control means operates the first switching device, so that the at least one first electric quantity related to the operation of the first switching device varies within first predefined limits.

12. The household appliance as in claim 11, wherein the control means initiates operation of the second switching device after the control means terminates operation of the first switching device when the desired power output of the power supply device is less than a predetermined value.

13. The household appliance as in claim 11, wherein the control means initiates operation of the second switching device before the control means terminates operation of the first switching device when the desired power output of the power supply device is greater than a predetermined value.

14. A method for operating a household appliance power supply device, comprising the steps of:
connecting a power supply device electrically to a household appliance;
configuring the power supply device with a switching converter;
electrically connecting a rectifying stage to the switching converter;
electrically connecting the rectifying stage with a main power supply input and a bus capacitor;
electrically connecting the bus capacitor in parallel with at least one output terminal of the rectifying stage;
electrically connecting a first resonant tank and a second resonant tank with at least a terminal of the bus capacitor;
electrically connecting a first switching device and a second switching device with the first resonant tank and the second resonant tank, wherein the first switching device and the second switching device have respectively a first switching period and a second switching period;
normally operating the first switching device independently from the operating conditions of the second switching device, so that one or more first electric quantities related to the operation of the first switching device follow corresponding first reference waveforms and/or first reference values;
operating the second switching device depending on the operating conditions of the first switching device and based in part on a desired power output of the power supply device, so that the first switching device and the second switching device work according to an interleaved mode, the second switching period is kept constantly equal to the first switching period, and a delay between initiating operation of the first switching device and initiating operation of the second switching device is based in part on the desired power output of the power supply device.

15. The method, according to claim 14, further comprising the step of operating the first switching device, so that at least one first electric quantity related to the operation of the first switching device vary varies within first predefined limits.

16. The method, according to claim 14, further comprising the step of operating the first switching device, so that the first switching device works in soft switching conditions.

17. The method, according to claim 14, further comprising the step of operating the second switching device, so that at least one second electric quantity related to the operation of the second switching device follows at least one corresponding second reference waveform and second reference value.

18. The A method, according to claim 17, further comprising the step of operating the second switching device, so that so that the at least one second electric quantity related to the operation of the second switching device varies within second predefined limits.

19. The method, according to claim 18, further comprising the step of operating the second switching device, so that the second switching device-works in soft switching conditions.

20. The method according to claim 14, further comprising the step of: initiating operation of the second switching device before terminating operation of the first switching device when the desired power output of the power supply device is greater than a predetermined value.

* * * * *